United States Patent Office 3,505,672
Patented Apr. 7, 1970

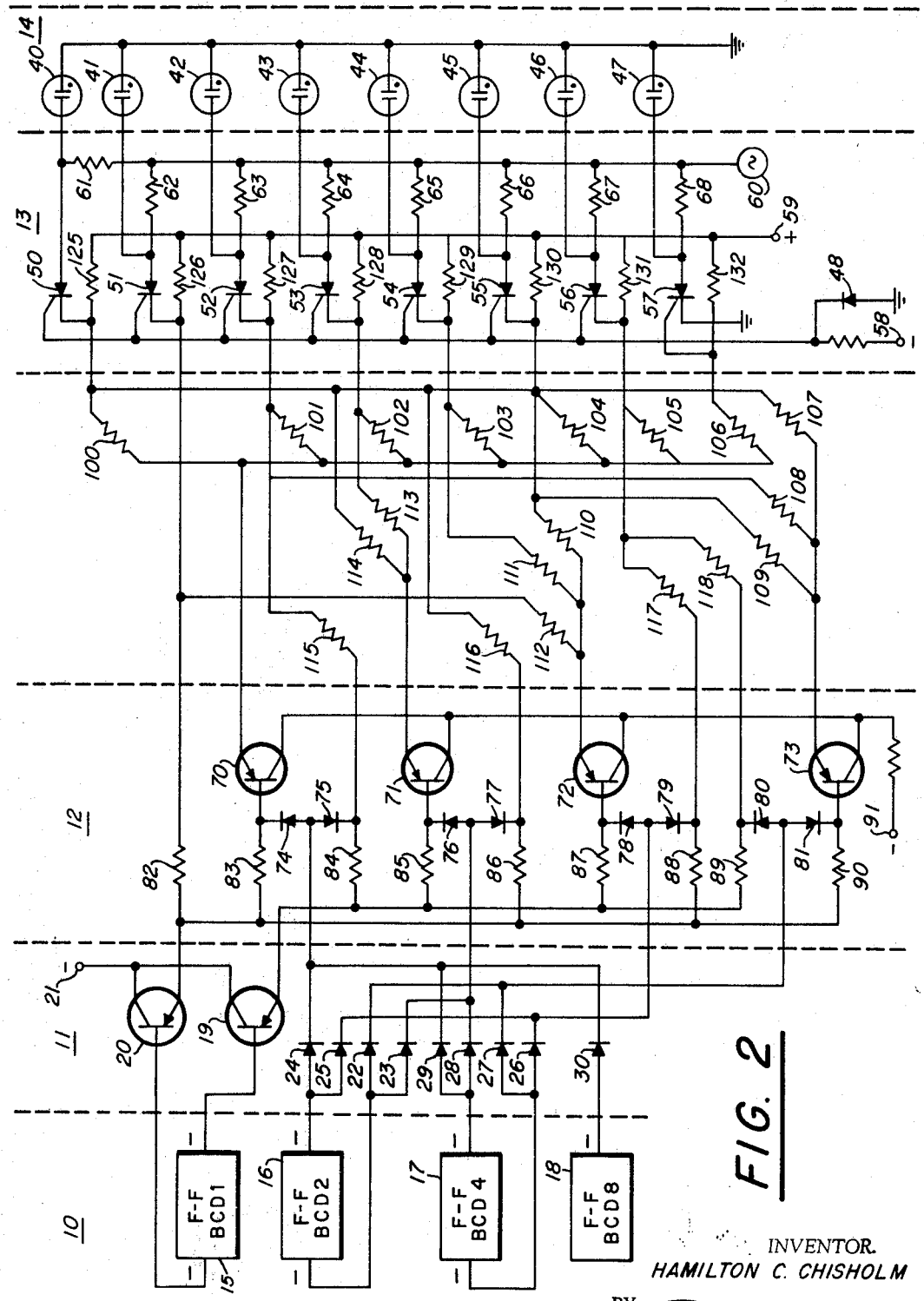
FIG. 2
INVENTOR.
HAMILTON C. CHISHOLM
BY 
ATTORNEYS

3,505,672
CODE TO READOUT TRANSLATOR
Hamilton C. Chisholm, Orinda, Calif., assignor, by mesne assignments, to the United States of America as represented by the Secretary of the Navy
Filed May 13, 1966, Ser. No. 551,183
Int. Cl. G06f 5/00
U.S. Cl. 340—347                                   1 Claim

ABSTRACT OF THE DISCLOSURE

A source of binary coded decimal signals representative of one of several characters is fed into a decoding matrix that converts the binary coded decimal signals to plurality of double-weighted code signals. The double-weighted code signals are passed through a gating circuit to actuate certain silicon control rectifiers to actuate discrete sections of a visual display element to form the desired character. An improved translator circuit changing binary coded decimal information to biquinary information utilizing a minimum amount of circuit components is thusly provided to ensure higher reliability than contemporary circuits.

STATEMENT OF GOVERNMENT INTEREST

The invention described herein may be manufactured and used by or for the Government of the United States of America for governmental purposes without the payment of any royalties thereon or therefor.

It is well known to provide a readout system for connecting BCD (binary coded decimal) outputs to a visual readout. However in the existing systems using electroluminescent elements, complicated translator circuitry has been required to actuate particular electro-luminescent elements when forming the desired numeral or character. The obvious disadvantage of these systems would be a relatively low reliability since the excessive number of components and the characteristics of the elements used in the complicated networks would tend to fail relatively often. Another disadvantage of the known systems is that due to the excessive number of components and the relatively complicated circuitry involved, great precautions had to be taken to protect the circuits from the ambient environment (e.g. from the effects of humidity or shock).

It is an object of the present invention to provide a new and improved translator circuit that translates information from a source of binary information to a visual readout.

It is an object of the present invention to provide a translator which utilizes a minimum amount of components.

Another object of the invention is to provide a translator which transforms binary coded decimal information to biquinary to thereby minimize the circuitry required in the translator circuit.

It is an object of the invention to provide a translator readout circuit which is adaptable to known binary coded decimal readouts.

A further object of the present invention is to provide a translator circuit having its visual display elements in a normally on-condition to permit the forming of numerals by switching off certain ones of said visual display elements with silicon controlled rectifiers thereby resulting in an increased speed of operation.

It is an object of the invention to provide a simple rugged circuit of high reliability which is especially adapted for use under adverse conditions such as those found aboard ship or in aircraft where a readout from a source of information is required.

Briefly the invention is directed to an apparatus for transforming a plurality of binary coded decimal outputs representative of a number of characters to a visual display readout. The readout to be described below is an electroluminescent readout. A decoding matrix receives the binary coded decimal outputs and converts the outputs to a plurality of double-weighted code outputs. Respective ones of the double-weighted code outputs are connected to the gating circuit to actuate certain ones of the gating elements. In addition through a plurality of conductors the double-weighted code outputs are transmitted to actuate respective ones of a plurality of switching means. Silicon-controlled rectifiers (the switching circuit) are each connected to one of the array of visual display elements. Upon transmission of a particular double-weighted code output to the plurality of silicon controlled rectifiers a particular numeral or character will be formed by the visual display elements.

Various other objects and advantages will appear from the following description of one embodiment of the invention and the novel features will be particularly pointed out in connection with the appended claims.

FIG. 2 is a schematic of the embodiment shown in FIG. 1.

Figure 1:
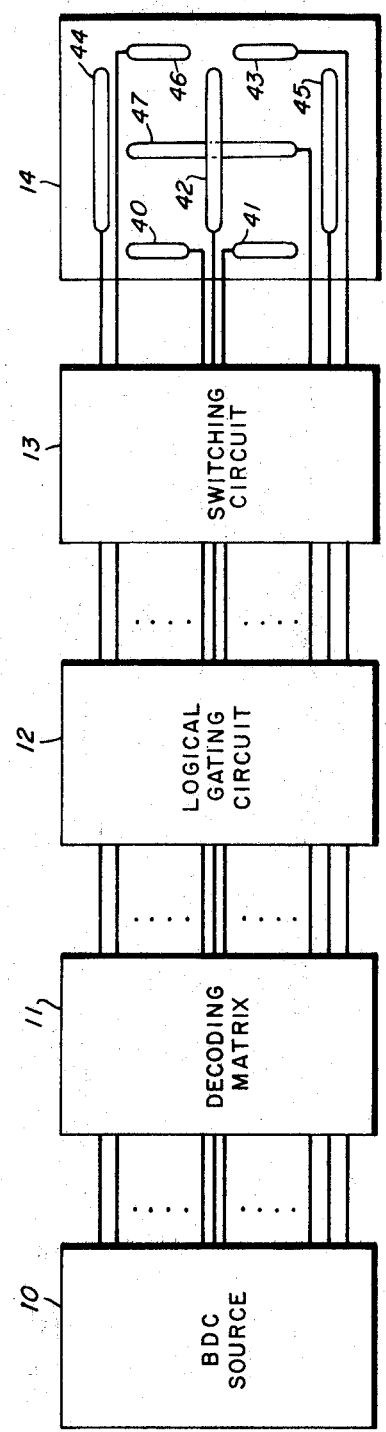
FIG. 1 is a block diagram showing the preferred embodiment of the visual display readout.

Referring now to the drawings FIG. 1 shows a block diagram of the invention wherein the different components are grouped according to a particular function. Source 10 represents the source of binary coded decimal information. This source could be the readout of a computer or any well known storage means. In decoding matrix 11 the binary coded decimal outputs from the source 10 are transformed into a double-weighted code. In a binary coded decimal system each decimal digit is replaced by a group of binary digits. The code used has widespread use since the chief advantage of the code is that translation from decimal to binary code and back again can be done very easily one decimal digit at a time or one character representation at a time. This advantage is paid for in wasted space and increased complexity of computer logic due to the greatly increased number of required components. Therefore, it is to the advantage of the designers to convert the binary coded decimal code to a different code which would require a lesser amount of components to effect the necessary logical functions. A double-weighted code has been found to be preferred since this code's logical functions inherently require much less complicated circuitry to effect the desired operations. In the present invention this conversion from BCD to a double-weighted code was from BCD to a biquinary code. In the biquinary code a decimal digit is replaced by two digits. Conventionally, one of these digits is a quinary digit which has one of the values from 0 to 4 and the other is a binary digit which has one of the two values 0 or 5. In the instant invention the quinary digit is assigned the values, 2, 4, 6, 8, and the binary digit is 0 or 1. Therefore a particular representation in biquinary code is presented in such a way that the sum of the two values is equal to the value of the decimal digit which it represents.

The biquinary code of outputs are transmitted to the logical gating circuit 12 which gates selected ones of the switching circuit 13 to a source of potential. The switching circuit 13 then switches its respectively associated visual display elements (shown as display block 14) in accordance with the signal received by the logical gating circuit 12 elements.

In the schematic diagram shown in FIG. 2 the source 10 of BCD information consists of four flip-flops 15, 16, 17, 18 which produce negative potential levels representative of a decimal digit from 0 to 7. These potential levels are then transmitted to the decoding matrix 11. The decoding matrix includes two portions, one portion being for the production of a binary digit and including the binary digit transistors 19, 20 and potential source 21. The portion of the matrix which produces the quinary digit includes the quinary diodes 22 to 30. The binary digit portion is connected to be responsive to the output of flip-flop 15 and the biquinary portion is connected to be responsive to the outputs of flip-flops 16, 17 and 18. Here it should be noted that the binary portion of the coding matrix may operate independently of the logical gating circuit 12 to provide a source of potential 21 to certain ones of the switching means (silicon controlled rectifiers 50–57) to switch the respectively associated visual display elements (electroluminescent elements 40–47) either on or off in a manner set forth below.

Turning now to the visual display element, electroluminescent elements 40–47, which, for example, may be neon tubes, are arranged in the present embodiment to the invention to form the numbers 0 through 7 although it would be within the scope of the invention to arrange the neon elements so as to form different characters if it so desired. Here it should be pointed out that in the specific embodiment the elements 40–47 are arranged as shown in FIG. 1 but are shown schematically in FIG. 2. Electroluminescent elements 40 through 46 are normally "on" while electroluminescent 47 is normally "off" therefore by selectively extinguishing certain ones of the elements 40–46 and selectively turning on element 47 the desired numeral may be formed in the visual display element.

Connected to respective ones of the electroluminescent elements 40–47 are a plurality of switching means which in the preferred form are silicon controlled rectifiers 50–57. The silicon-controlled rectifiers 50–56 are maintained normally non-conducting by biasing each of the silicon controlled rectifier's 50–56 gates negative with respect to its cathode with gate potential source 58. Since the silicon-controlled rectifier's gates are negative with respect to the positive potential from cathode potential source 59 that is impressed on their respective cathodes, the state of non-conduction is maintained in the rectifiers 50–56. An alternating potential source 60 which, in the preferred form is 900 VPP at 500 c.p.s. is connected in common to the electroluminescent elements 40–47. The maximum value of source 60 is less than the peak forward blocking voltage of the rectifiers thereby permitting conduction only when the rectifiers are gated. Reduction resistors 61–68 are provided to prevent overloading the electroluminescent elements. When the silicon-controlled rectifiers 50–56 have their respective cathodes negative with respect to the gates the rectifiers will conduct resulting in a potential drop across the rectifiers which approach zero. When the drop across the rectifier is zero their associated electroluminescent elements 40–46 will no longer be conducting. Therefore by selectively gating the rectifiers 50–56 so that their cathodes are negative with respect to the gates, selective actuation of the electroluminescent elements can be affected.

On the other hand rectifier 57 has its gate positively biased with respect to its cathode and so that when the rectifier 57 is conducting, the drop across the rectifier approaches zero and the electroluminescent element 47 is extinguished. It should also be pointed out that it is desirable to maintain the gate of the silicon-controlled rectifier negatively biased with respect to its cathode to prevent the rectifiers passing any leakage current that develops when the rectifiers are operated above their maximum rated temperatures, for when operated thereby silicon-controlled rectifiers lose completely their ability to block forward voltage and assume characteristics of an ordinary diode.

The logical gating circuit 12 is adapted to receive the biquinary outputs from the decoding matrix 11. Each of the gating elements therein includes a transistor 70–73 and respectively associated diodes 74–81. Limiting resistors 82–90 are provided in the gating element circuit to prevent overdriving of the gating elements. Interconnecting circuitry extending from the logical gating circuit 12 to the switching circuit 13 is provided with series resistors to prevent overloading or overdriving of the switching circuit and to prevent control of silicon-controlled rectifiers other than those which are to be actuated. Also included within the logical gating circuit 12 is gating potential source 91 which provides a source of potential for selective biasing of the transistors 70–73.

Operation of the translator circuit is substantially as follows; binary coded decimal information from the source 10 passes through the decoding matrix 11 and is converted into a biquinary code as explained above. The negative potential levels from the binary portion and the quinary portion of the decoding matrix are passed to actuate certain ones of the gating transistors 70–73. The binary digit transistors 19, 20 and the gating transistors 70–73 are selectively actuated according to the information contained in the biquinary output to connect the matrix potential 21 and gating potential source 91 to selective ones of the silicon-controlled rectifiers 50–57. By connecting the potential source 21 and the potential source 91 to the cathodes of silicon-controlled rectifiers 50–56 the cathodes of the respective silicon-controlled rectifiers are negative with respect to the cathode resulting in conduction of the silicon-controlled rectifier in a manner as set forth above. Similarly silicon-controlled rectifier 57 has its gate rendered negative by connection of the potential sources 21 or 91 to thereby render the rectifier 57 non-conductive so that electroluminescent element 47 would be turned "on."

In the specific embodiment set out above the transistors 20 and 19, 70–73 were two N2404 type, the diodes 22 through 30, 74–81 and 48 are IN366's. The silicon-controlled rectifiers are GE type C5DX142, the values of the resistors 61–68 were 2.7 megohms the value of the resistors 83–90 and 100–114 are 2.7 kilohms. The values of resistors 115–118 is 1.5 kilohms. Resistor 82 has a value of 3.9 kilohms; resistors 125–131 have a value of 15 kilohms. Resistor 132 has a value of 8.2 kilohms. The values of potential source 21, 91 and 58 is −15 volts. Potential source 59 has a value of +15 volts.

While a specific embodiment described above shows negative information levels gating PNP transistors it would well be within the scope of the invention to provide positive information levels for gating NPN transistors with the diodes associated with respective transistors being oppositely biased. Of course, the potential sources would have to have opposite polarity to accommodate such a design expedient. What has been set forth above is a new translator circuit which provides simplicity and reliability by reason of the novel application of the reduced amount of components used therein.

The invention may be embodied in other specific forms without departing from the spirit or special characteristics thereof. The present embodiments are therefore to be considered in all respects as illustrative and not restrictive.

What is claimed is:

1. An apparatus for transforming a plurality of binary to decimal code outputs representative of a plurality of characters to a visual display readout comprising;

a matrix having a plurality of interconnected diodes and a plurality of transistors separate from said diodes, said plurality of diodes connected to provide an output representative of one digit of a double-weighted code and said plurality of said transistor being connected to provide an output representing the other digit of said double-weighted code for decoding said plurality of said binary to decimal code outputs to a plurality of double-weighted code outputs, a plurality of gating elements adapted to receive said double-weighted code outputs, each of said gating elements being actuated only by receiving particular double-weighted code outputs and each including two diodes and a single transistor, said diodes and said transistor being interconnected to provide a selective source of switching potential when individual ones of said gating elements are actuated, an array of visual display elements each element being representative of a portion of a character to be displayed, a plurality of switching means, each being a silicon controlled rectifier connected to a discrete gating element and responsive to a discrete said switching potential controllably connected to one of said plurality of visual display elements, and formed of a gate, anode, and cathode with all but one of said silicon rectifiers having its gate negatively biased with respect to its cathode, an alternating potential source connected across said silicon rectifiers having a value less than their peak forward blocking voltage, and a plurality of conductors interconnecting said plurality of gating elements to said silicon rectifiers having individual ones of said silicon rectifiers being connected to at least one of said plurality of gating elements wherein, each of said silicon controlled rectifiers having its gate negatively biased is non-conducting to maintain its respective connected display element in a normally "on" condition and said all but one of said silicon rectifiers being connected to maintain its respective connected display element in a normally "off" condition.

References Cited

UNITED STATES PATENTS

| | | | |
|---|---|---|---|
| 3,293,416 | 12/1966 | Chisholm et al. | 340—347 |
| 3,309,695 | 3/1967 | Klinikowski | 340—347 |
| 3,340,524 | 9/1967 | Rinaldi | 340—347 |
| 3,372,265 | 3/1968 | Gordon et al. | 235—92 |
| 3,373,419 | 3/1968 | Mathamel | 340—324 |
| 3,400,388 | 9/1968 | Blank | 340—336 |

MAYNARD R. WILBUR, Primary Examiner

J. GLASSMAN, Assistant Examiner

U.S. Cl. X.R.

340—324, 336